Feb. 18, 1969  L. CATOZZO  3,428,511
FILM SPLICING DEVICE
Filed Dec. 20, 1965
*Fig. 1*
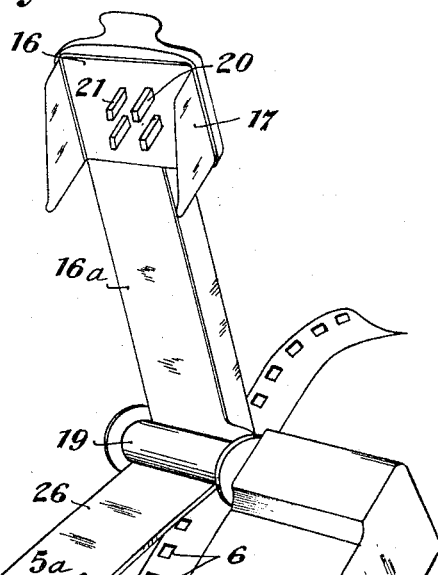
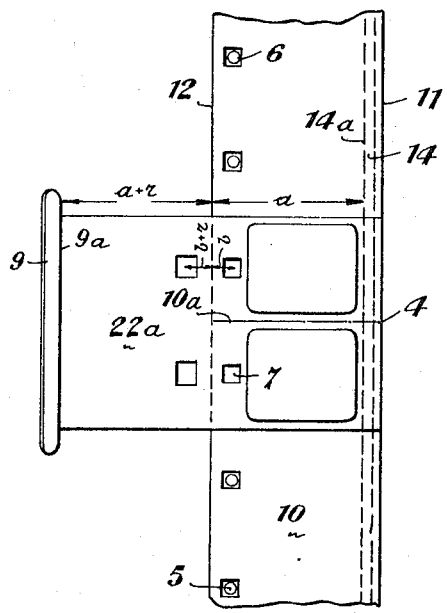
*Fig. 2*
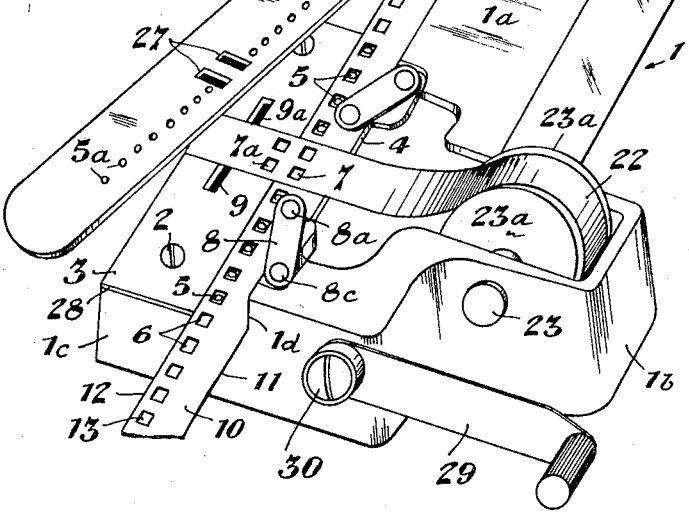
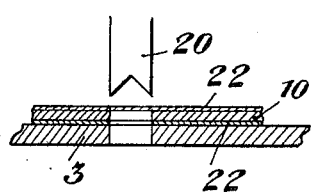
*Fig. 3*
INVENTOR.
LEO CATOZZO
By: Kelman and Berman
Agents

United States Patent Office 3,428,511
Patented Feb. 18, 1969

3,428,511
FILM SPLICING DEVICE
Leo Catozzo, 2/B Via Ferdinando Fuga,
Rome, Italy
Filed Dec. 20, 1965, Ser. No. 514,980
Claims priority, application Italy, May 28, 1965,
11,756/65
U.S. Cl. 156—505     9 Claims
Int. Cl. B31f 5/06

My present invention relates to apparatus for splicing, by the use of unpreperforated adhesive tape as a connecting material, strip and ribbon shaped items in general, such as magnetic tapes, cinematographic films and the like. It particularly refers to an improved device for splicing, practically in a single stroke, one-side perforated films where the sound track receiving area is located adjacent the unperforated side of the film, such as the so-called "super-eight" film.

Film splicing devices using common unperforated adhesive tape as a connecting means are known per se. Thus, my U.S. Patent 3,075,572 teaches two devices of this general class, one for splicing standard films and the second for normal, one-side perforated substandard films having, however, their sound track receiving area located adjacently to the perforated side.

Owing to the difference in sound track location between these normal substandard films and the substandard films of the first mentioned class, which, for the sake of brevity, I shall forthwith term "super" type films, the second device of my U.S. patent would result unfit for said super type films. In fact, the splice obtained by it would overlap the sound track and produce, correspondingly to it, in the film an increase in thickness, which, during the projection, would cause the noises commonly termed "splice bumps."

Thus, it is an object of my present invention to provide a novel film splicing device, which is adapted to splice super type films.

It is another object of my invention to provide a novel film splicing device which, additionally to the modified features and arrangements necessary for the splicing of said type of films, also incorporates improvements which, in comparison to the known art, impart to it the capacity of splicing films more simply, rapidly and effectively.

The objects and improvements of my present invention will become apparent from the following exemplificative description of one of its possible embodiments, taken with reference to the attached drawing, in which:

FIGURE 1 is a perspective view of the embodiment illustrating my present invention.

FIGURE 2 is a schematic view showing the mode of splicing a film.

FIGURE 3 is a schematic view of the punch heads and the means of detaching perforation chips from them.

In the following description, the terms "right," "left" refer to the position as viewed in the figures, "inward" and "outward" as related to the centerline of the film strips positioned for splicing on the apparatus.

With reference to FIGURE 1, the splicing device according to my invention comprises a base, generally indicated at 1, preferably a hollow light-metal casting. This base can be considered as consisting of an elongated, generally prismatic central portion 1a, carrying on the left side a supporting structure for a lower die-plate 3 and, on the right side, approximately facing the middle of said die-plate, a known type tape roll housing 1b. The adhesive tape roll 22 is freely rotatable in said housing around a pin 23 passed through the housing flanks. To avoid direct frictional contact between the inner faces of the housing flanks and the tape roll sides, and to prevent, on the other hand, axial and angular displacements of said roll within the housing, the tape roll is interposed between two discs 23a of synthetic material, their thickness being such as to approximately fill the space between the tape roll and said internal housing faces, to secure said tape roll rotatably in a position such that a length of tape drawn from it will be oriented pretty accurately perpendicular to the film ends, and with its centerline approximately coinciding with the splice line. The term "splice line" is here meant to indicate the line of contact between the butts of the films laid end to end preparatory to the splicing operation proper.

The shelflike structure 1c supporting the lower dieplate 3 is preferably made slightly lower than the main base portion 1a, so as to form between them two small vertical elongated steps 1d. The lower dieplate 3 is fastened to structure 1, as by screws 2.

Dieplate 3 is provided with a row of known registering pins 5, running parallel to the longitudinal axis of the base 1 and therefore, parallel to step 1d, said pins being spaced from step 1d at such a distance that when the film strips 10 to be spliced are placed with their perforation holes 6 on the registering pins, the film edge 11, opposite the perforation 6, will abut against the step 1d. Thus, the step forms an additional guide means to keep the film ends perfectly aligned.

Correspondingly to the splice area the row of registering pins 5 is interrupted by a number of through holes 7, taking the place of the pins, their mutual spacing corresponding to the perforation pitch. In other words, they are placed correspondingly to the terminal perforation holes of each film strip, so that, when the strips are placed on the dieplate, these holes will register exactly with the perforation holes overlying them. In the figures, altogether two such holes 7 are provided, disposed symmetrically on both sides of the splice line and correspondingly to the last perforation hole of each film end. The contour of holes 7 corresponds to that of the perforation holes 6 and holes 7 are provided with a sharp upper rim, intended to coact, in a manner per se known, with punch means 20 to pierce holes into the strap of adhesive tape after the latter has been applied over the film ends.

Although only two such holes are shown in the drawing, it goes without saying that their number could be increased, if a splice of greater width appears desirable, without departing from the scope of the present invention. However, an adhesive tape strap approximating the width of two film frames, and thus extending over one perforation hole of each film end, has proven more than adequate for all purposes, and thus the use of a greater number of perforations, and consequently of punch heads, as well as of a wider adhesive tape, would merely involve additional costs and the greater effort required to simultaneously punch a larger number of holes through said tape.

The portion of the dieplate 3 in which the tape cutting and perforating operations proper are performed is better shown in the enlarged view of FIGURE 2. It presents, between the two steps 1d, a cutting edge 4, alined with said steps and therefore also parallel to the registering pins 5. Owing to the already discussed spacing of the row of registering pins 5, the edge 11 of the unperforated margin of the film strips positioned on said pins will lie flush with said dieplate edge 4. Oppositely and parallel to edge 4 the dieplate 3 is provided with a second cutting edge 9a, forming one long side of a slot 9. The spacing of edge 9a from the edge 12 of the perforated margin of the film strips 10 when these are positioned on the registering pins 5, is equal to the distance a between said edge 12 and the internal borderline 14a of the sound track receiving area, increased by the length r of the arcuate tape portion formed around the edge of a film when a tape is folded around said film. Between the cutting edge 9a and the die holes 7, and correspondingly to the latter, the dieplate is provided with dieholes 7a, of a contour approximately equalling that of dieholes 7, but of a size slightly larger than the latter.

The distance between the center of said holes 7a and the edge 12 of the film strips 10 positioned on the registering pins 5 is equal to the distance b between said edge 12 and the center of the perforations, increased by the already defined folding arc.

The lower dieplate edges 4 and 9a coact with blades 17 and 18 respectively, while the dieholes 7 and 7a coact with as many punches 20 and 21, respectively, the cross-sectional shape of the punch heads being that of an inverted V, for reasons which will be discussed later.

The blades and punches are mounted on an upper dieplate 16, correspondingly to their coacting parts on the lower dieplate 3. Upper dieplate 16 is secured to the upper end of an arm 16a, whose lower end is fulcrumed to the main base portion 1a, as by a bolt 19.

Owing to this arrangement, if the upper dieplate 16 is depressed on the lower dieplate 3 on which, as better shown in FIGURE 2, a length of adhesive tape 22, drawn from the tape roll, has previously been applied over the two film strip ends contacting each other along the splice line 10a, blade 17, coacting with edge 4, will shear the tape flush with film edge 11, blade 18, coacting with edge 9a, will shear it at a distance $a+r$ from film edge 12, so as to form an adhesive tape tongue 22a, while the punches 20 and 21, coacting with the respective dieholes 7 and 7a, will cut perforation holes into the tape, correspondingly to perforations on the film 6 and on the tongue 22a respectively. Owing to the spacing between the film edge 12 and the cutting edge 9a and the holes 7a, respectively, the adhesive tongue formed, once folded back around film edge 12 and pressed against the lower film face, will end flush with the internal border line 14a of the area receiving the sound track, while the holes punched through the tongue 22a by punches 21 will register with the holes punched through the tape by punches 20 and consequently with the film perforations in the splice area.

Therefore, the differences between the conformation of the upper and lower dieplates in the present device and the conformation of the corresponding dieplates in the film splicers of the prior art permit the making of spliced joints for super type films, in which the tongues of adhesive tape, although bent around the films to cover their two faces, leave free the perforation holes in the splice area as well as the sound track receiving area 14, to avoid a disadvantageous increase in thickness in said area and the undesirable consequences it entrains.

An additional improvement of my present device over the known art is the provision of a third cutting edge 28 on said lower dieplate 3. Said edge is intended to serve, in association with a blade 29 fulcrumed in 30 on base 1, for the trimming of film strip ends preparatory to the splice, and eliminates thereby the need for an extra trimming plate.

Cutting edge 28 is made normal to the row of registering pins and advantageously, though not necessarily, is spaced exactly half a perforation pitch or gage from the registering pin nearest to it. This arrangement causes the terminal portion of each film strip positioned on the pins 5 to be trimmed exactly along the center line of a frame line. Consequently, the two films, when placed end to end for the splicing operation, will meet exactly along line 10a, therefore the distance between the two terminal holes of the film butts will exactly equal the perforation pitch, so that the splice will cause no inconvenience during the projection of the film.

A further differentiating feature of the present device consists in two retaining arms 8a, which serve to hold the film ends—which show a tendency to curl up—in place on the dieplate prior to and during the application of the adhesive over them. In the present embodiment they are pivotable on the base 1 in a horizontal plane around their respective pivots 8c, and their free ends form a smooth cup-like depression, which, when the arms are swung over the films, keep the latter from curling upwards. The arms are swung back after the application of the tape.

Another feature which differentiates the present device over the known art is a hold-down plate 26, which is independent of the upper die plate 16, and projecting beyond it, when both are depressed, to offer a fingerhold.

In the embodiment shown, this plate 26 has its fulcrum 19 in common with arm 16a which carries the upper dieplate. It is understood, however, that this arrangement has only been chosen for simplicity and convenience of construction. Hold-down plates serve, as known, as an additional safety against the displacement of the film strips during the punching and severing of the adhesive tape, and additionally as a means to detach the punches from the holes they have cut into the tape, when the upper dieplate is lifted. The hold-down plate is provided with perforations 5a and slots 27 correspondingly to the registering pins 5 and the punch rows 20 and 21, which permit the passage of these members through it when said plate 26 is placed over the splice and the upper dieplate 16 depressed upon it. The independence of rotation of the dieplate permits a safer disengagement of the punches from the holes they produce.

The punch heads in the present device have the shape of an inverted V. If, prior to the placing of the films on the lower dieplate, one or more layers of adhesive tape are applied over the splicing area of this plate 3, and this or these layers perforated by punches 20 and 21 in the described manner, the combination of the V-shaped punch heads and the adhesive layer yields the unexpected result of detaching the perforation chips from the punch heads during the successive film splicing operations, and thus of maintaining the punch heads constantly ready for their service.

It is understood that the device hereinbefore described and illustrated constitutes a particularly advantageous embodiment of my invention, and that many changes and alterations in its structure, form and interconnection of parts can be made without departing from its spirit and scope.

What I claim is:

1. A film splicing device of the class using adhesive tape for splicing together the ends of two cinematographic film strips of the type having only one margin perforated and the opposite unperforated margin adapted to receive a sound track, said device comprising:
  (a) stationary cutting means, coacting with movable cutting means, to sever a length of adhesive tape, applied to the splice area of said film strips, on one side coincidently with the edge of the unperforated margin and, on the other side, at a distance from the edge of the perforated margin, to form a tongue of adhesive tape projecting beyond said perforated margin;
  (b) stationary diehole means, coacting with movable punch means, to pierce holes into said applied adhesive tape coincidently with the film perforation holes in the splice area and on the tongue, the holes punched through said tongue being spaced, from the edge of the perforated margin, a distance equalling the distance between said film edge and the perforations plus the folding arc of the tape.

2. A film splicing device as claimed in claim 1, comprising in combination:
  (a) a base means;
  (b) lower die plate means secured to said base means, said dieplate means including: a first cutting edge; film registering and positioning means spaced from said cutting edge so as to position the edge of the unperforated film margins flush with said first cutting edge; a second cutting edge spaced from said first cutting edge a distance greater than the width of the film strips being spliced; a first row of dieholes coinciding with the film perforation holes in the splice area of said films; a second row of dieholes, located, correspondingly to said first die holes, between the first dieholes and said second cutting edge;

(c) upper dieplate means including:
first blade means coacting with said first cutting edge; second blade means coacting with said second cutting edge, to sever an adhesive tape applied to the splice area flush with the edge of the unperforated film margin on one side and, on the other side, at a distance from the edge of the perforated film margin, said cutting operations forming thereby an adhesive tape strap whose one end terminates flush with the edge of the unperforated film margin and whose other end forms a tongue projecting beyond the edge of the perforated film margin; punch means coacting with the first diehole row to pierce holes through the tape strap corerspondingly to the film perforation; punch means coacting with said second row of dieholes to pierce holes through said tongue portion of said adhesive strap.

3. A film splicing device as claimed in claim 2, wherein the holes of said second diehole row are larger than the holes of said first diehole row and their center is spaced, from the edges of the perforated margin of the film strips, when placed on the registering means, a distance approximately equalling the distance betwen said film strip edge and the center of the perforation holes increased by the length of the folding arc described by said tongue when it is folded around the film edge, and wherein the second cutting edge is spaced, from the edge of the perforated film margin, a distance equalling the sum of the distance between said film edge and the internal borderline of the sound track receiving area of said film, plus said folding arc.

4. A film splicing device as claimed in claim 2, wherein the upper dieplate is rotatably mounted to the base carrying said lower dieplate.

5. A film splicing device as claimed in claim 2, further comprising two upwardly extending steps at both sides of said first cutting edge and alined with it.

6. A film splicing device as claimed in claim 2, further comprising a hold-down plate interposable between the lower and upper dieplates, said hold-down plate being mounted on said device for a movement independent of said upper dieplate.

7. A film splicing device as claimed in claim 2, wherein the lower dieplate further includes a third cutting edge coacting with a movable blade to trim film strips preparatory to their splicing on said film splicing device.

8. A film splicing device as claimed in claim 2, wherein the cross section of the heads of the punches in said upper die head have the shape of an inverted V and the lower dieplate carries at least one layer of adhesive tape perforated correspondingly to the dieholes, to detach the perforation chips adhering to said heads after they have perforated the adhesive tape strap.

9. A film splicing device as claimed in claim 3, further comprising:
(a) retaining means displaceable on said device over the film strip ends placed on the lower die plate;
(b) tape roll housing means rotatably mounting interchangeable tape rolls;
(c) rotatable spacer means, approximately filling the space between each side of said tape roll and the internal housing wall facing it, to prevent axial and angular displacements of said tape roll in said housing.

References Cited

FOREIGN PATENTS 881,463  11/1961  Great Britain.

DOUGLAS J. DRUMMOND, *Primary Examiner.*